United States Patent [19]
Bell, Jr.

[11] Patent Number: 5,842,440
[45] Date of Patent: Dec. 1, 1998

[54] ANIMAL SELF-GROOMING AIDS

[76] Inventor: Richard E. Bell, Jr., 16652 Brigadoon Dr., Tampa, Fla. 33618

[21] Appl. No.: 704,238

[22] Filed: Aug. 28, 1996

[51] Int. Cl.$^6$ .................................................... A01K 13/00
[52] U.S. Cl. .......................... 119/621; 119/664; 119/612; 119/706
[58] Field of Search ..................... 119/621, 622, 119/651, 652, 664, 612, 613, 706; 15/160, 161, 104.92, 215, 216, 217, 164; D30/158

[56] References Cited

U.S. PATENT DOCUMENTS

| | | | |
|---|---|---|---|
| 56,252 | 7/1866 | Newbury | 15/161 |
| D. 255,610 | 6/1980 | Clarke-Fodor | D30/158 |
| 1,271,094 | 7/1918 | Spickerman | 15/217 |
| 2,704,852 | 3/1955 | Stone | 15/216 |
| 3,486,485 | 12/1969 | Kahanick | 119/706 |
| 4,558,482 | 12/1985 | Neuman et al. | 15/104.92 |
| 4,866,805 | 9/1989 | Oden et al. | 15/161 X |
| 5,176,105 | 1/1993 | Madden | 15/160 X |
| 5,345,641 | 9/1994 | Webster | 15/161 X |
| 5,517,945 | 5/1996 | Udelle | 119/706 X |
| 5,540,186 | 7/1996 | Udelle | 119/706 X |
| 5,572,955 | 11/1996 | Boshears | 119/706 |
| 5,595,141 | 1/1997 | Udelle et al. | 119/706 |

*Primary Examiner*—Jeffrey A. Smith
*Assistant Examiner*—Yvonne R. Abbott
*Attorney, Agent, or Firm*—Charles A. McClure

[57] ABSTRACT

Self-grooming aid for animals, especially felines, whereby they can brush their fur or hair and can exercise or sharpen their claws. Such animal can stand at least partly on a base adapted to be clawed and with head or body at the level of a brush adapted to be rubbed. The brush is removable for cleaning or manually brushing the animal, and the mat is removable for replacement when thoroughly clawed.

10 Claims, 2 Drawing Sheets

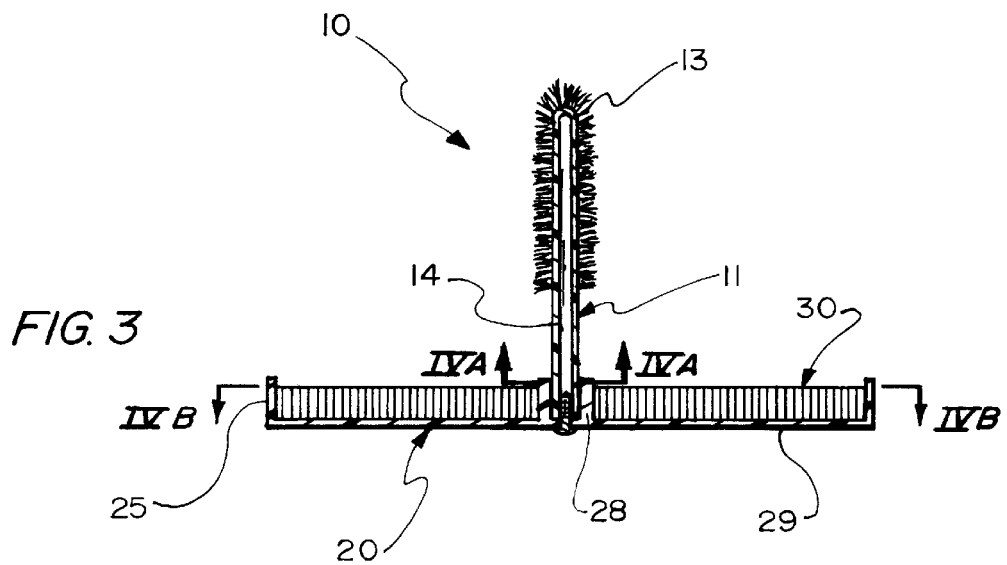
FIG. 3
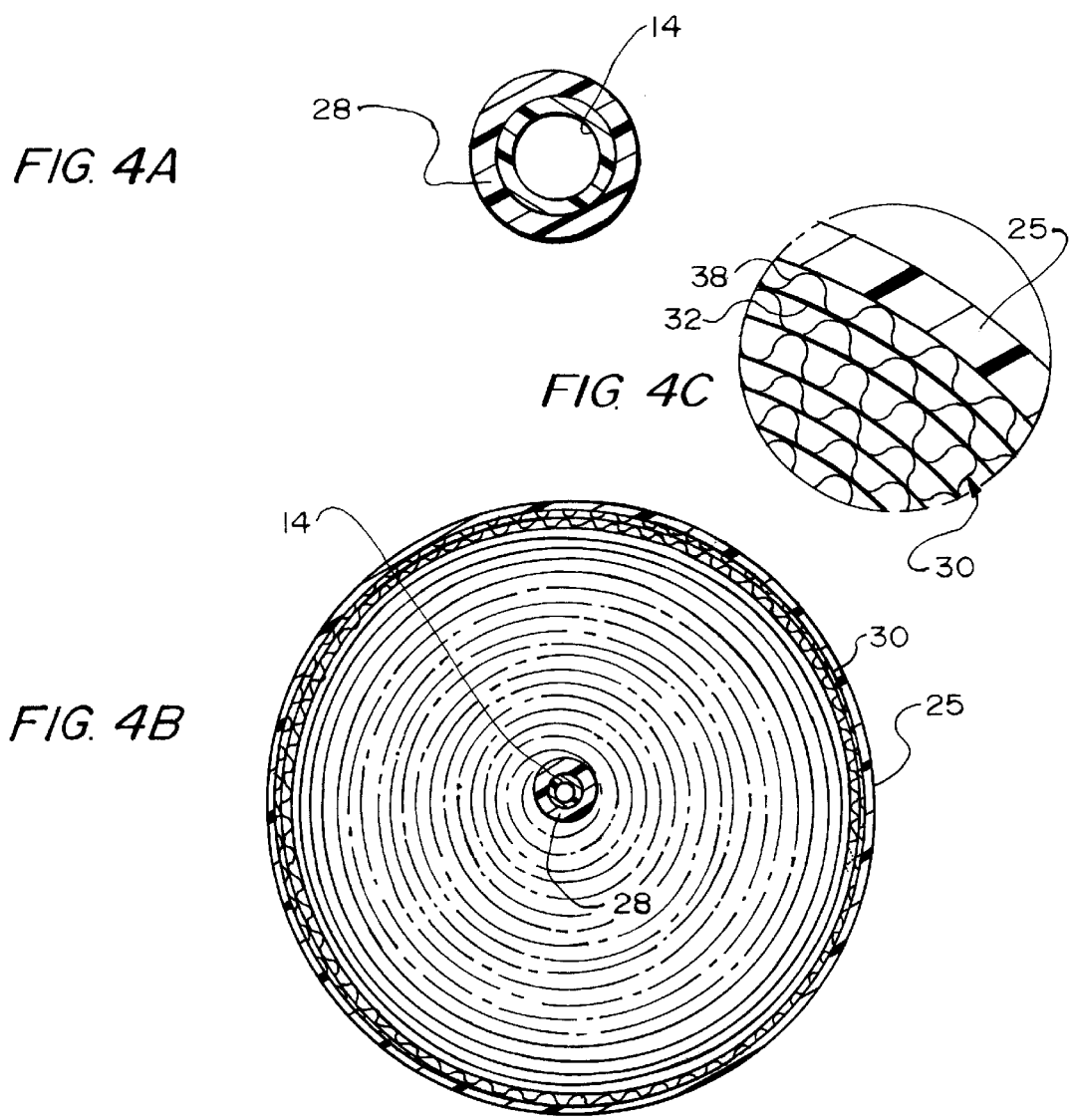
FIG. 4A
FIG. 4C
FIG. 4B

५,८४२,४४०

ANIMAL SELF-GROOMING AIDS

TECHNICAL FIELD

This application relates to structure and use of self-grooming aids for animals having claws and/or fur, especially felines.

BACKGROUND OF THE INVENTION

Just as humans have at least a generally tendency to wash and comb their hair, so most animals have a tendency to groom their fur, as by rubbing against something rough-surfaced, especially when lacking sufficiently prehensile means for holding a comb or equivalent. Pet owners may not realize how time-consuming such grooming can be, at least until they undertake to assist the pet either personally or by paying a professional groomer. Furthermore, felines particularly also exercise their claws upon trees and whatever similar materials may be available. When animals are kept as pets, their practices of rubbing against and clawing fabric articles can become expensive to prevent or to remedy, short of declawing them. Yet people cannot reasonably expect a cat, for example, to view their curtains, upholstery, or floor coverings as mere decoration, when the fabrics are so much fun to claw or so comfortable to rub against (or both).

Inventors have undertaken to provide materials and objects for pet owners to make available to their pets as grooming accessories, in the hope of saving household articles and materials from damage. U.S. patents include such informative examples as Goldson U.S. Pat. No. 2,894,487; Bryson U.S. Pat. No. 2,997,019; Cook U.S. Pat. No. 3,581,707; Lind U.S. Pat. No. 4,517,922, Clarke-Fodor U.S. Pat. No. D-255,610; and Borak U.S. Pat. No. D-235,270. Most teach fabric-covered posts or similar structures difficult to maintain and limited as to utility.

SUMMARY OF THE INVENTION

A primary object of the present invention is to lower costs of maintaining self-grooming means for animals, such as household pets.

Another object of this invention is to improve the suitability of animal self-grooming means and methods for pets and their owners.

A further object of the invention is to enhance the versatility of animal self-grooming aids in the home.

In general, the objects of this invention are accomplished, in the self-grooming of animals, by enabling an animal to stand on a base supporting both horizontal and vertical scratching surfaces. One such surface may be better for clawing, and another for rubbing.

In particular an animal self-grooming assembly according to the present invention preferably has both a horizontal clawing surface on its base, on which the animal can stand in substantial part, and a vertical surface with bristles radiating out from part of it.

Other objects of this invention, together with methods and means for attaining the various objects, will become apparent from the following description and the accompanying diagrams of at least one embodiment, presented by way of example rather than limitation.

SUMMARY OF THE DRAWINGS

FIG. 3 is an axial sectional elevation through the apparatus;

FIG. 4A is a sectional plan through the brush handle junction with the upstanding brush support, at level IVA—IVA on FIG. 3;

FIG. 4B is a downward sectional plan through the same support and the outer rim at the top edge of the disklike corrugated mat, taken at level IVB—IVB on FIG. 3.

FIG. 4C is an enlarged detail of the nearby part of FIG. 4B.

DESCRIPTION OF THE INVENTION

Figure 1:
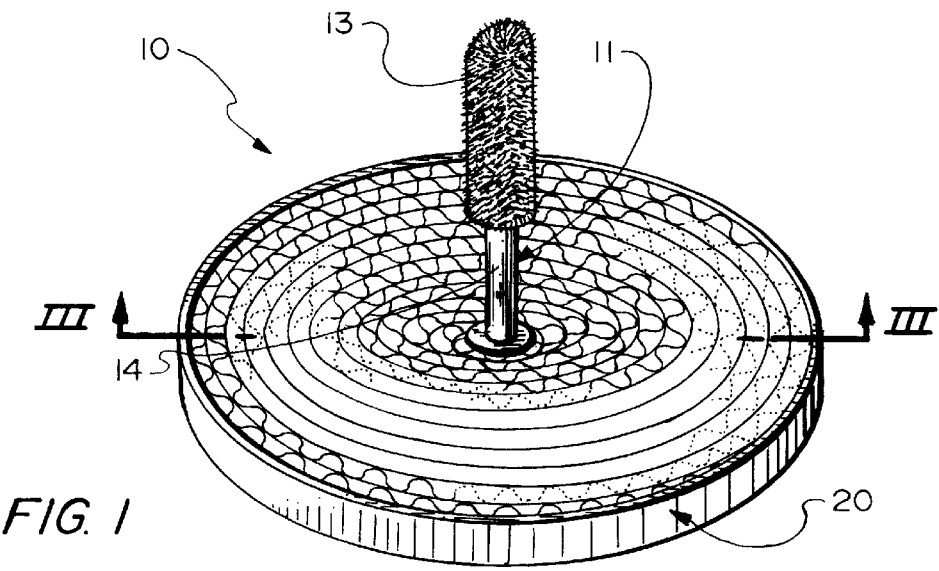
FIG. 1 is a perspective view of apparatus of this invention, fully assembled, being symmetrical about its central vertical axis.
Figure 2:
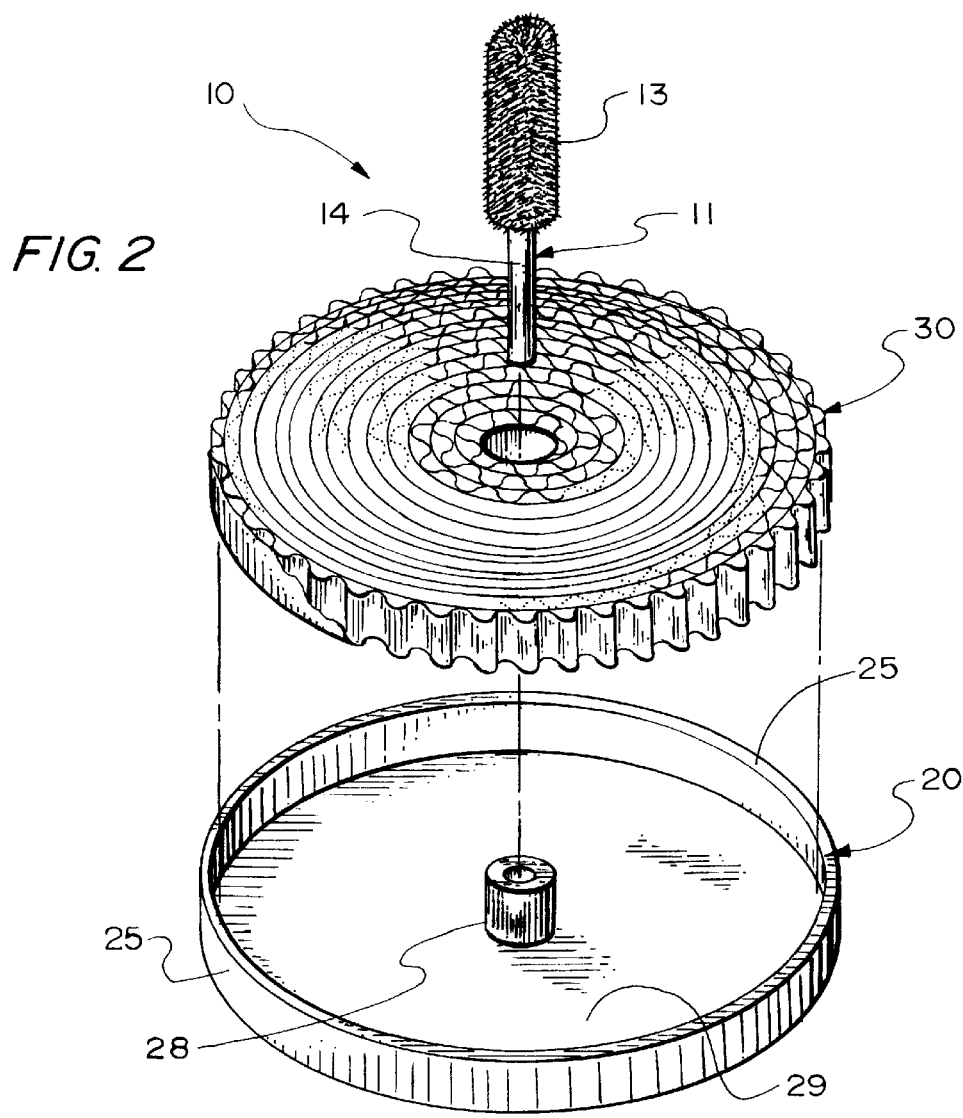
FIG. 2 is an exploded perspective view of the same apparatus.

FIGS. 1 and 2 show, in perspective, preferred embodiment 10 of this invention: first, fully assembled; next, vertically exploded. Featured is removable generally cylindrical brush means 11, having an upper bristle-carrying portion covered by clumps of bristles 13 extending outwardly, also having lower bristle-free handle portion 14. Pan-like supporting means 20 has flat base 29, peripheral rim portion 25 upstanding from the base along its entire perimeter, and has upstanding open-ended axial cylindrical holder means 28 adapted to receive therein, and so to support, the preferably closed-end lower handle portion of the brush means snugly, but removably. The space from the holder means outward to the inner surface of the peripheral rim is filled with removable, preferably corrugated, mat 30 on base 29.

FIG. 3 shows, in vertical axial section, same embodiment 10 fully assembled as in FIG. 1. Bristles 13 extend radially outward from the cylindrical axis along the upper vertical portion of brush means 11, in which their inner ends are embedded, also radially outward from the hemispherical top end (semicircular in axial section). The handle of the brush means fits snugly but removably in the open upper end of the holder means. More details appear in later views.

FIG. 4A shows, in sectional plan upward at IVA—IVA on FIG. 3, brush handle portion 14 fitting snugly within supporting holder portion 28 upstanding from base 29 of supporting means 20.

FIG. 4B shows, in sectional plan taken downward at IVB—IVB on FIG. 3, and FIG. 4C shows an offset enlarged detail of a nearby part thereof, brush holder portion 28 surrounded by disklike corrugated mat means 30. The mat is made up of facing layer 32 and undulating or corrugated layer 38, of a depth preferably not exceeding the rim height, wound helically outward from the brush holder to upstanding rim 25.

Operation of the described preferred embodiment of the present invention is readily apparent from the drawing views and accompanying description, together with the following procedural commentary.

The brush means can be grasped by the handle and be removed from its support for manipulation, whether to brush an animal's hair or fur, or to remove an accumulation of hair or fur from the brush. With the brush handle in place in the upstanding holder, bristles are at a convenient height for a cat or other four-footed pet to rub its head and body against, usually while the animal has at least two of its feet on the corrugated mat, thus steadying the whole assembly in place. Cats especially will also claw the corrugated mat, which is held in place by the perimeter rim.

The preferred mat structure comprises a corrugated strip wound helically and fitting removably on the base, coaxial with the holder and within the peripheral rim, the strip width (vertical) not exceeding the (also vertical) distance from the base to the top of the perimeter rim. The wound facing strip has an inner and/or outer corrugated strip(s) of like width, mutually adherent along segments spaced apart and running the full width(s)—vertical here—thereof, corresponding to the mat depth here.

Even when snugly wound, such a mat has a residual axial opening ready to fit around the upstanding brush holder of the base, and for the present purpose has a maximum wound diameter sufficient to allow a snug fit inside the perimeter rim of the base. While the brush is out of its holder, the wound mat is easily lowered to its coaxial location on the base. The used mat can be removed readily, especially as its structure is likely to have been weakened by persistent clawing. Alternatively, the mat structure—and the base—can be made rectilinear, instead of helical, form.

No unusual materials are required for the practicing of this invention. The brush handle and the bristle-supporting portions are preferably made up of durable plastic, such as nylon, polyvinyl chloride, or polyethylene, the bristles being of like or different plastic anchored therein preferably in clumps of several dozen each.

The base and its upstanding axial and peripheral portions are preferably made of wood or plastic material or both, and are secured together adhesively or by fastening means, such as screwed brackets.

The wound mat is made up of preferably single-faced corrugated paper, as commonly used to wrap bottles and like articles for shipping. For this use, one end of a corrugated strip is commonly glued to a cylindrical core (made of heavy paper, wood or plastic) capable of fitting around the upstanding brush holder. The corrugated strip is wound helically around the core and itself, being glued together as it goes, and continues outward to a diameter fitting snugly into the upstanding rim of the circular base.

Alternatively, the mat may be made of double-faced corrugated paper, built up into flat layers and laminated together adhesively or otherwise. In outline or plan, such a laminated mat may be square, hexagonal, or other desired shape, rather than round.

Honeycomb or gas-expanded solid cellular structures are other alternatives to corrugated paper—but are likely to be prohibitively expensive, less attractive, and/or even harmful to a pet. There is no need to use expensive mat components, as pets are quite likely to prefer the frangibility of a paper mat as most natural.

The householder who provides his pet(s) with the self-grooming assembly of this invention will be amazed at how extensively the pet uses it—and even a gratifying improvement in the pet's disposition. A correlative benefit is the reduction in pet-induced wear and tear on curtains, rugs, and upholstery. It more than pays for itself.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

The invention claimed:

1. Animal grooming device, comprising base means having a generally flat underlying surface, for supporting an animal standing thereabove while grooming, and including respective axial holding means and peripheral holding means upstanding there from and adapted to support removably the following scratching means:

(a) brush means having a generally cylindrical core, smaller in diameter than in length, with bristles extending laterally outward and bristles extending both obliquely and vertically upward from its upper end portion, and with its lower end portion useful as a handle for use of the brush means when apart from the base means, and as a support for the brush means when fitted removably into and so supported by the axial holding means; and (b) scratch-receptive corrugated mat means, in the form of a shallow cylinder having a central opening and thereby fitting snugly around the axial holding means and adapted to be laterally retained thereby at substantially the center of the base, and by fitting snugly within the peripheral holding means at substantially the outer perimeter of the base.

2. Animal grooming device according to claim 1, combined with and removably holding the corrugated mat means snugly against the respective axial and peripheral upstanding holding means.

3. Animal grooming device according to claim 1, combined with and removably holding the brush means snugly against the upstanding holding means.

4. Animal grooming device according to claim 1, combined with and simultaneously removably holding both such brush means and such corrugated mat means.

5. In an animal grooming device with a supporting base for an animal to stand on at least partly, the improvement comprising the following scratching means supported thereby:

(a) removable brush means, supported above the base of the grooming device, having a lower part useful as a handle when not so supported, and having an adjoining upper part with bristles extending outward and bristles extending upward therefrom;

(b) removable scratch-receptive corrugated mat supported at the base of the grooming device.

6. Animal grooming device according to claim 5, including axial means removingly supporting the brush means and the corrugated mat means.

7. Animal grooming device according to claim 5, including axial and peripheral means removably supporting the corrugated mat means.

8. A self-grooming device for animals, especially felines, the device comprising a flat circular underlying base supporting an upstanding open-ended tubular central member and an upstanding peripheral rim; and a removable corrugated mat resting on the base and having a central opening, fitting snugly about the upstanding central member and fitting snugly within the upstanding peripheral rim.

9. The self-grooming device improvement of claim 8, in combination with a brush having a generally cylindrical handle end portion free of bristles and adapted to fit snugly but removably into the open end of the upstanding tubular central member.

10. The self-grooming combination of claim 9, wherein the brush's bristled end portion has bristles extending radially from its cylindrical surface portion, bristles extending axially from the center of its end surface portion, and bristles extending obliquely from the intervening part of the bristled end surface portion at angles ranging between axial and radial.

* * * * *